US007020978B1

(12) United States Patent
Nelson (10) Patent No.: US 7,020,978 B1
(45) Date of Patent: Apr. 4, 2006

(54) ADJUSTABLE POSITION TOOL GUIDE

(76) Inventor: James Nelson, 1000 Gordon Dr., Sioux Falls, SD (US) 57103

( * ) Notice: Subject to any disclaimer, the term of this patent is extended or adjusted under 35 U.S.C. 154(b) by 0 days.

(21) Appl. No.: 10/374,178

(22) Filed: Feb. 25, 2003

(51) Int. Cl.
*G01B 3/10* (2006.01)

(52) U.S. Cl. ............................ 33/760; 33/427; 33/759; 33/770

(58) Field of Classification Search ................... 33/42, 33/427, 429, 474, 476, 755, 758, 759, 760, 33/770, 768
See application file for complete search history.

(56) References Cited

U.S. PATENT DOCUMENTS

| | | | | |
|---|---|---|---|---|
| 1,521,054 A | * | 12/1924 | Sniegocki ..................... 33/2 R |
| 1,936,998 A | * | 11/1933 | Summers ................... 235/71 A |
| 2,058,330 A | * | 10/1936 | Little ........................... 33/474 |
| 2,563,674 A | * | 8/1951 | Coots ........................... 33/403 |
| 3,036,791 A | | 5/1962 | Siggelkow | |
| 3,364,581 A | * | 1/1968 | Andrews ..................... 33/427 |
| 4,200,984 A | * | 5/1980 | Fink ............................ 33/427 |
| 4,255,856 A | | 3/1981 | Mackie | |
| 4,433,486 A | * | 2/1984 | Muehlenbein ............... 33/501 |
| 4,642,898 A | * | 2/1987 | Miller ......................... 33/761 |
| 4,667,412 A | * | 5/1987 | Carlson ........................ 33/760 |
| 4,702,012 A | * | 10/1987 | Miller ......................... 33/427 |
| 4,967,482 A | * | 11/1990 | Hoover et al. ................ 33/760 |
| 5,113,596 A | | 5/1992 | Meyers | |
| 5,197,195 A | | 3/1993 | Aikens | |
| 5,349,760 A | | 9/1994 | DeVito | |
| 5,367,785 A | * | 11/1994 | Benarroch ................... 33/767 |
| 5,390,425 A | | 2/1995 | Gilberts | |
| 5,390,426 A | * | 2/1995 | Hull ............................ 33/770 |
| 5,406,711 A | | 4/1995 | Graham | |
| 5,442,866 A | * | 8/1995 | Woods ......................... 33/760 |
| 5,481,810 A | * | 1/1996 | Hastings et al. .............. 33/760 |
| 5,515,617 A | | 5/1996 | Canfield | |
| 5,782,007 A | * | 7/1998 | Harris .......................... 33/42 |
| 5,787,599 A | | 8/1998 | Clifton | |
| 5,842,284 A | | 12/1998 | Goldman | |
| 5,848,481 A | | 12/1998 | Parsons et al. | |
| 6,070,338 A | | 6/2000 | Garity | |
| 6,173,505 B1 | * | 1/2001 | Munno ........................ 33/760 |
| 6,393,710 B1 | | 5/2002 | Hastings | |
| 6,434,854 B1 | | 8/2002 | MacColl et al. | |
| 6,470,589 B1 | * | 10/2002 | Simmons ..................... 33/759 |
| 6,473,984 B1 | * | 11/2002 | Splain et al. ................. 33/760 |
| 6,497,050 B1 | * | 12/2002 | Ricalde ....................... 33/770 |
| 6,553,684 B1 | * | 4/2003 | Jenkins et al. ............... 33/770 |
| 6,817,110 B1 | * | 11/2004 | Bohnengel ................. 33/555.4 |

* cited by examiner

*Primary Examiner*—R. Alexander Smith
(74) *Attorney, Agent, or Firm*—Angenehm Law Firm; N Paul Friederichs (57) ABSTRACT

An adjustable position tool guide is disclosed for performing operations with tools on a work piece at an accurate distance and orientation with respect to edges or other features of the work piece in a highly convenient manner. The tool guide includes a base for positioning on the work piece. The base has a base edge for aligning in a substantially parallel orientation to a longitudinal axis of the work piece, and a work edge oriented perpendicular to the base edge for being oriented perpendicular to the longitudinal axis of the work piece when the base edge is aligned parallel with the longitudinal axis. The guide also includes a tape measure mounting assembly mounted on the base for mounting a tape measure on the base. The tape measure mounting assembly is slidably moveable on the base along a line oriented substantially parallel to the base edge of the base.

17 Claims, 5 Drawing Sheets

ADJUSTABLE POSITION TOOL GUIDE

BACKGROUND OF THE INVENTION

1. Field of the Invention

The present invention relates to tool guides and more particularly pertains to a new adjustable position tool guide for performing operations with tools on a work piece at an accurate distance and orientation with respect to edges or other features of the work piece in a highly convenient manner.

2. Description of the Prior Art

Devices have been proposed and produced that are designed to guide the movement of tools with respect to a work piece in a particular orientation to the geometry of the work piece. These guides are often used to guide the movement of a saw, such as a power saw, across a work piece to cut the work piece to a desired length.

While the use of such guides can be useful, especially when a large number of work pieces need to be cut to various lengths, the guides are most useful if a lateral side of the shoe of the power saw can be slid along a portion of the guide that is oriented substantially parallel to the desired direction of movement of the saw. However, the typical configuration of portable circular power saws is irregular in the sense that the housing extends for a significant distance from one side of the saw beyond one lateral edge of the shoe, while the housing does not extend beyond the other lateral edge of the shoe. Typically, the protruding housing interferes with the movement of one of the lateral sides of the shoe along the known guides, especially those guides that employ conventional measuring tape devices that tend to extend upwardly from the surface of the work piece, and interfere with the movement of the protruding housing. As a result, only the lateral side over which the housing of the saw does not extend is able to slide along the guides. This can be problematic as this requires the user of the saw to either only use one hand to hold the saw (regardless of whether the user is right-handed or left-handed) or position himself or herself on only one side of the work piece (but not the other). This has significantly limited the usefulness of such guide devices.

Another difficulty that limits the known guide devices is the ability to accurately measure the distance between the end of the work piece and the operative edge of the guide, or more usefully, the saw blade of the saw as the saw is moved along the operative edge of the guide device. Since a tape measure used in conjunction with these devices cannot extend all the way to the saw blade without hampering movement of the saw, the distance measurement indicated on the tape is not the actual distance from the end of the work piece. Some type of adjustment needs to be made to the reading of the tape measure at some point, such as adding a known compensating distance to the distance indicated on the tape to compensate for the distance between the saw blade and the measurement indicated on the tape. This requires repeated calculations at each measurement, and introduces the possibility of measurement errors when numerous measurements are made, even when the adjustment to the measurement is deemed to be simple.

In these respects, the adjustable position tool guide according to the present invention substantially departs from the conventional concepts and designs of the prior art, and in so doing provides an apparatus primarily developed for the purpose of performing operations with tools on a work piece at an accurate distance and orientation with respect to edges or other features of the work piece in a highly convenient manner.

SUMMARY OF THE INVENTION

In view of the foregoing disadvantages inherent in the known types of tool guides now present in the prior art, the present invention provides a new adjustable position tool guide construction wherein the same can be utilized for performing operations with tools on a work piece at an accurate distance and orientation with respect to edges or other features of the work piece in a highly convenient manner.

To attain this, the present invention generally comprises a base for positioning on the work piece. The base has a base edge for aligning in a substantially parallel orientation with a longitudinal axis of the work piece, and a work edge oriented perpendicular to the base edge for being oriented perpendicular to the longitudinal axis of the work piece when the base edge is aligned parallel with the longitudinal axis of the work piece. The guide also includes a tape measure mounting assembly mounted on the base for mounting a tape measure on the base. The tape measure mounting assembly is slidably moveable on the base along a line oriented substantially parallel to the base edge of the base.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

A significant advantage of the present invention is that it provides a guide for the movement of a power saw for either right or left handed users, regardless of which side of the work piece the user is working. Further, the tool guide of the present invention provides the user with an accurate, visually observable measurement of the distance between the end of the work piece and the blade of the power saw without requiring the user to adjust the measurement indicated by a tape measure. The tool guide of the present invention may also be easily adapted to work pieces with various widths. Additionally, auxiliary support mat be provided to the tape of a tape measure used with the guide when large distances are to be measured.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
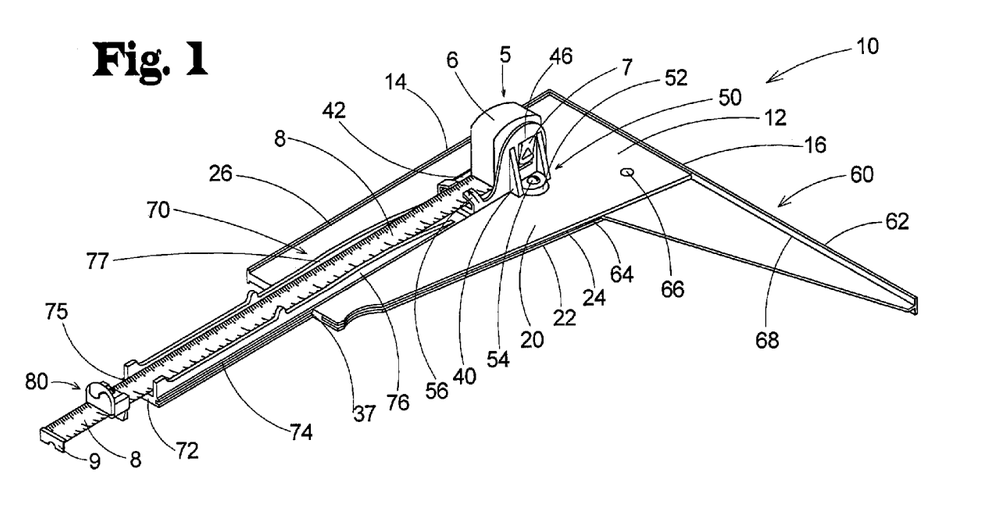
FIG. 1 is a schematic upper perspective view of a new adjustable position tool guide according to the present invention.
Figure 2:
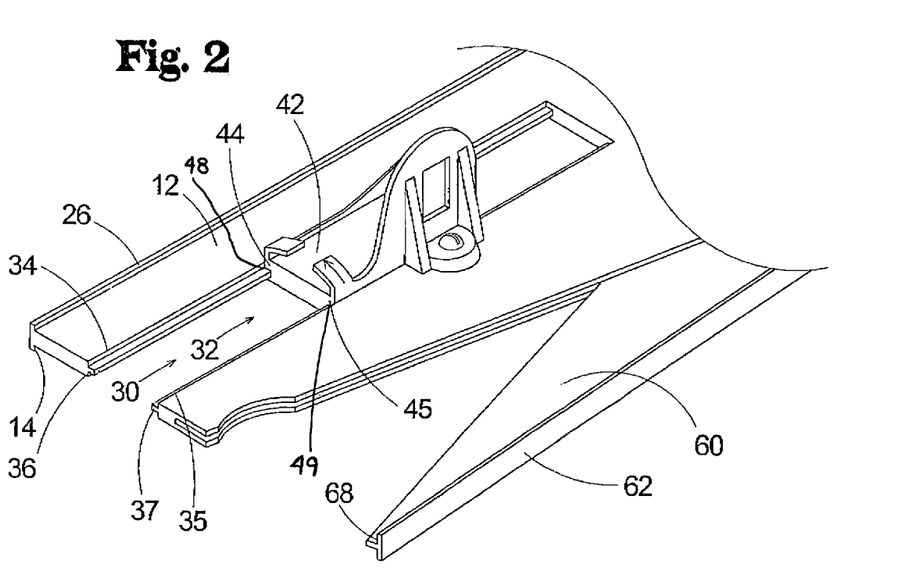
FIG. 2 is a schematic end perspective view of the present invention.
Figure 3:
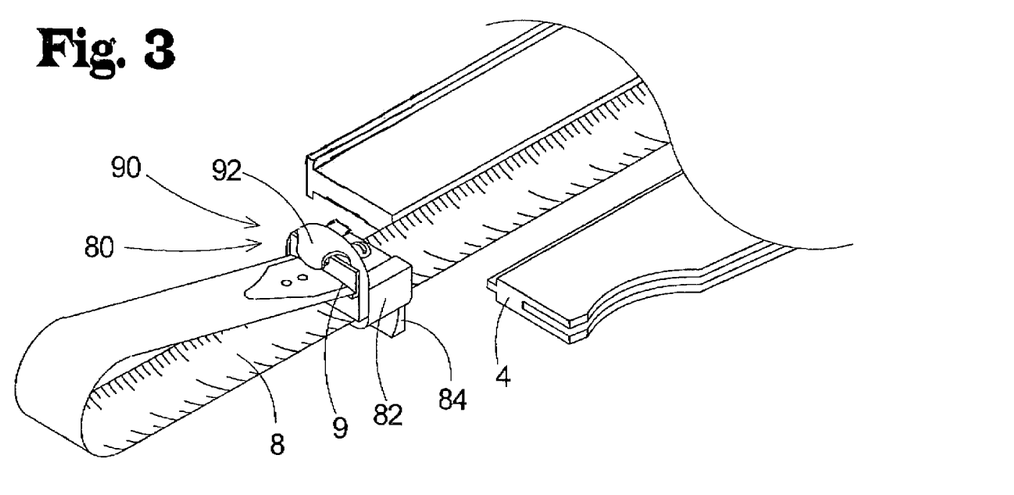
FIG. 3 is a schematic side perspective view of the tape length adjustment structure of the present invention.
Figure 4:
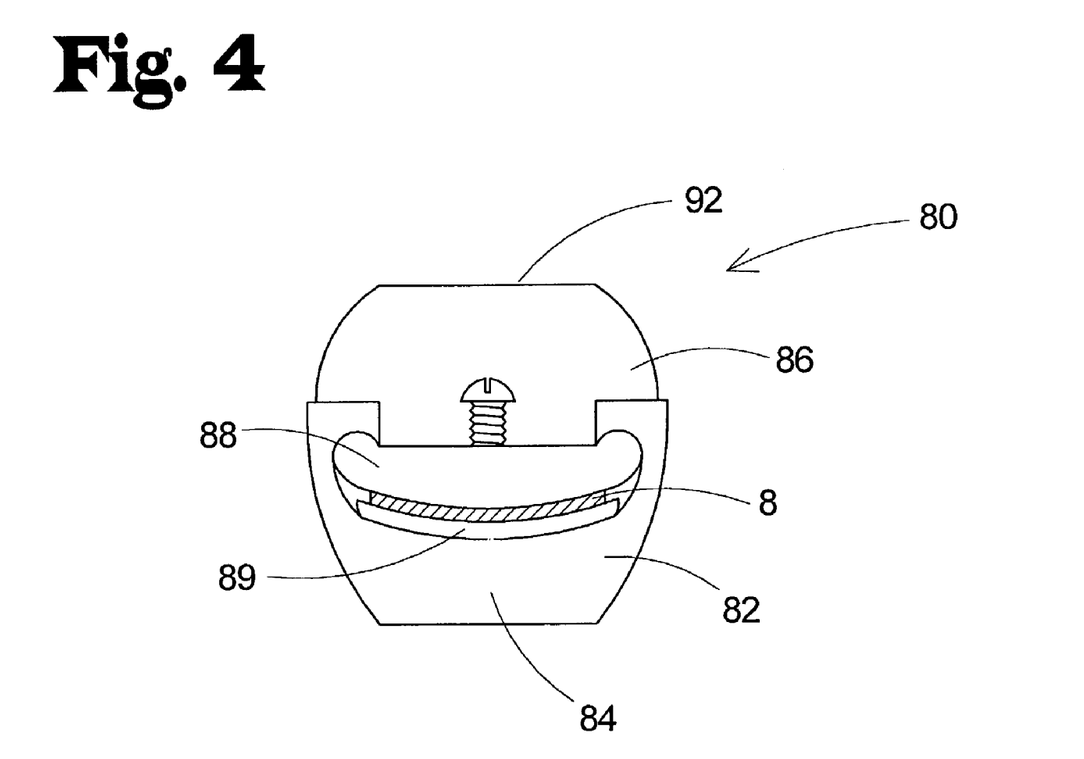
FIG. 4 is a schematic front view of the tape length adjustment structure of the present invention.
Figure 5:
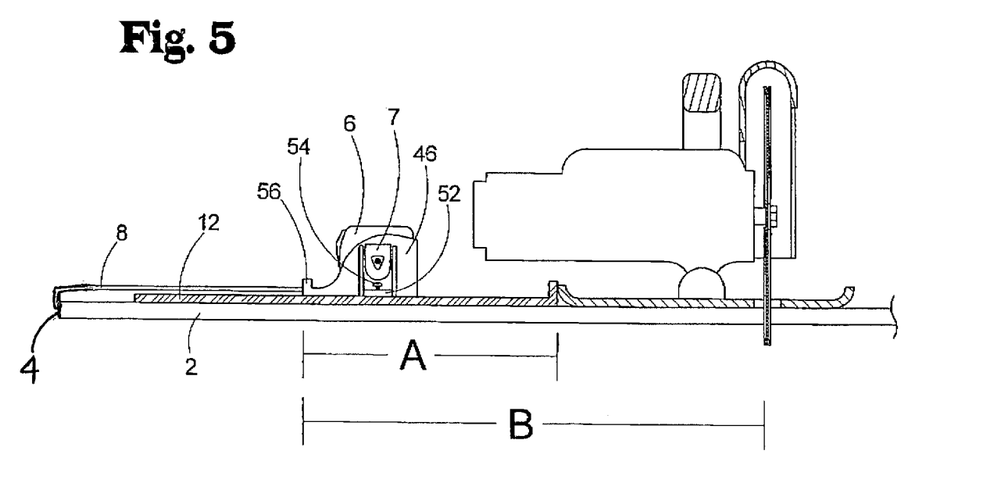
FIG. 5 is a schematic side view of the tool guide of the present invention in conjunction with a power saw.

With reference now to the drawings, and in particular to FIGS. 1 through 5 thereof, a new adjustable position tool guide embodying the principles and concepts of the present invention and generally designated by the reference numeral 10 will be described.

As best illustrated in FIGS. 1 through 5, the adjustable position tool guide 10 may be used on a work piece 2 having an end 4 or edge (or other feature of the work piece} from which the user needs to measure and perform an operation. The tool guide 10 is suitable for positioning at an adjustable distance from the end 4 of the work piece 2 for facilitating operations on the work piece that require the establishment and maintenance of a stable edge at a selected distance on the work piece, such as, for example, marking the work piece with a marking tool or guiding the movement of a saw or other tool with respect to the work piece. The tool guide is suitable for use with an otherwise conventional tape measure 5 having a housing 6, a mounting clip 7, and a length of tape 8 extendable from and retractable back into the housing. The tape 8 has an end 9 which typically includes structure such as a tab for hooking or wedging on an end or edge of a work piece, and from which a plurality of measurement indicia are marked along the length of the tape.

The tool guide 10 includes a base 12 for positioning on the work piece 2. The base 12 has a base edge 14 that may be aligned in a substantially parallel orientation with a longitudinal axis of the work piece 2, such as a longitudinal side edge of a board of dimension lumber. The base 12 also has a work edge 16 that is oriented perpendicular to the base edge 14 for being oriented perpendicular to the longitudinal axis of the work piece when the base edge is aligned parallel with the longitudinal axis of the work piece. The base 12 has a top side 20 and a bottom side 22, and may also have an auxiliary edge 24 that is located on the base 12 opposite the base edge 14. Various measurement indicia may be marked on the top side (and even the bottom side) of the base along the edges or on other locations on the side.

The base 12 of the guide 10 may include an alignment shoulder 26 or flange that is restable against a longitudinal edge of the work piece (such as, for example, the longitudinal side edge of dimension lumber) to align the base edge 14 with the longitudinal axis or length of the work piece. The alignment shoulder may extend or protrude from the bottom side 22 of the base 12 such that when the bottom side is rested against the upper face of a work piece, the alignment shoulder may be pressed against or snugged up against the longitudinal edge of the work piece. The alignment shoulder 26 may also extend from the top side 20 of the base 12 to permit the base to be oriented in an opposite direction for manipulation by the left- or right-hand of the user.

The base 12 may also have a guide structure 30 formed thereon for guiding movement of the tape measure mounting assembly discussed below. In one embodiment of the invention, the guide structure 30 includes a slot 32 that is formed in the base 12 ans extends between the top side 20 and the bottom side 22 of the base. The slot 32 may be elongate and have a longitudinal axis that extends substantially parallel to the base edge 14. The slot 32 may extend into a generally central area of the base from one end edge of the base toward the other end edge of the base, and the slot may extend through one of the end edges. The slot 32 may be defined by a pair of opposite side edges 34, 35 that extend along opposite sides of the slot. The opposite side edges 34, 35 may be oriented substantially parallel to each other. The guide structure 30 may also include a pair of tongues 36, 37, with each tongue being formed on one of the opposite side edges 34, 35 of the slot 32. Each of the tongues 36, 37 extend into the slot and are oriented in substantial opposition to each other.

The tape measure mounting assembly 40 of the guide 10 mounts the tape measure 5 on the base 12. The tape measure mounting assembly 40 is slidably mounted on the base 12 along a line that is oriented substantially parallel to the base edge 14 of the base 12. The mounting assembly 40 extends into the slot 32 of the base 12 and is movable in the slot. The mounting assembly 40 may be mounted on the tongues 36, 37 of the side edges 34, 35 of the slot 32. The tape measure mounting assembly 40 may include a mounting plate 42 that is slidably mounted on the base 12. The mounting plate 42 has marginal side portions 44, 45 located on opposite side locations of the mounting plate, and the marginal side portions may each include a grove 48, 49 for slidably receiving the respective tongues 36, 37 of the opposite side edges 34, 35 of the slot 32. The tape measure mounting assembly 40 may also include a mounting ear 46 that extends from the mounting plate 42 for removably securing the tape measure 5 to the mounting plate, and includes a hole formed therein for passing a clip fastener therethrough. The mounting ear 46 is positionable between the housing 6 of the tape measure 5 and the securing clip 7 of the tape measure so that securing the securing clip 7 to the housing clip 6 mounts the tape measure 5 to the mounting ear 46 and the mounting plate 42.

The tape measure mounting assembly 40 may also include means for securing the position of the mounting plate 42 (and any tape measure 5 mounted thereon) in the slot 32 of the base, and thereby permits fixing of the distance between the work edge 16 and the tape measure 5. The securing means may comprise a position securing assembly 50 that includes a securing tab 52 that extends from the mounting plate 42 to a location over the base 12, and a securing fastener 54 that extends through the securing tab 52. The securing fastener 54 is threaddedly mounted on the securing tab 52 so that rotation of the fastener advances an end of the fastener toward and against the base 12 to restrict or prevent movement of the mounting plate 42 with respect to the slot 32 in the base, and rotation of the fastener in an opposite direction moves the end of the fastener away from the base to permit relatively free movement of the mounting plate with respect to the base.

Optionally, the mounting assembly 40 may include at least one indicator tab 56 that extends from the mounting plate 42 for positioning over an extended portion of the tape 8 of the tape measure 5 for visual alignment with the measurement indicia on the tape to facilitate reading of the measurement of the tape.

Optionally, the guide 10 may include an extension arm 60 for selectively extending the usable length of the work edge 16 of the base with a work extension edge 62. The extension arm 60 may be pivotally mounted on the base 12, and may have a use position in which the work extension edge 62 is oriented substantially in line with the work edge 16 of the base 12, and a stored position in which the extension arm is positioned adjacent to the auxiliary edge 24 of the base. The extension arm 60 may have a locking slot 64 formed therein for receiving a mounting fastener 66 that is mounted on the base 12. The extension arm 60 may include a work ledge 68 or flange with the work extension edge 62 may be located on the work ledge 68.

The guide 10 of the invention may also include an elongate tape support member 70 for supporting an extended portion of the tape 8 of the tape measure 5 when the tape is extended from the housing 6. The tape support member 70 may be removably mounted on the base 12, and in one embodiment of the invention the tape support member is removably insertable into the slot 32 of the base for positioning adjacent to the tape measure mounting assembly 40 in the slot. The tape support member 70 may include a bottom wall 72 for resting a portion of the tape 8 thereon. The bottom wall 72 may have opposite side edges 74, 75 that have grooves for receiving the tongues 36, 37 of the side edges 36, 37 of the slot 32. The tape support member 70 may also include a pair of side walls 76, 77 that are mounted on and extend upwardly from the bottom wall 72. In one embodiment of the invention, the side walls 76, 77 extend substantially parallel to each other to form a channel for receiving and resisting lateral movement of the tape 8.

The invention may also include a tape length adjustment structure 80 that is removably mountable on the tape 8 of the tape measure 5 as a means for adjusting an effective extension length of the tape from the housing 6 of the tape measure 5. The tape length adjustment structure 80 may be positionable at a selected distance from the end 9 of the tape 8, and the selected distance may suitably correspond to a distance B between the work edge 16 and the indicator tab 56, but may also be positioned to reflect the distance A between the indicator tab and the saw blade of a power saw when the shoe of the power saw is rested against the work edge. In this configuration, the measurement shown at the indicator tab 56 of the position securing assembly 50 reflects the actual distance between the end of the tape and the work edge or saw blade. Thus, the user may use the alignment of the indicator tab 56 with measurement indicia on the measuring tape to determine the distance between the end of the work piece and the saw blade of the saw when the saw is positioned against the work edge 16.

The tape length adjustment structure may include a first portion 82 which may form a substantially U-shaped channel and may have a concave upper surface. The first portion 82 may include an auxiliary tape ledge 84 for hooking on an edge of the work piece in a manner similar to the ledge or tab at the end of a measuring tape. The auxiliary tape ledge 84 may extend from the first portion 82 in a direction that is substantially opposite of the U-shaped channel. The tape length adjustment structure 80 may also include a second portion 86 that is removably mounted on the first portion 82. A part of the second portion 86 may be removably nestable in the substantially U-shaped channel of the first portion 82. The second portion 86 may comprise first 88 and second 89 sections that are pivotally mounted together for selectively pinching a portion of the tape 8 of the tape measure therebetween. The first 88 and second 89 sections of the second portion 86 may be held together when the part of the second portion is nested or positioned in the U-shaped channel of the first portion 82 to pinch the tape 8.

Optionally, the tape length adjustment structure 80 may include means for minimizing the protrusion of the tape beyond the tape length adjustment structure so that this unutilized portion of the tape is less likely to, for example, unintentionally become hooked on things or interfere with the use of the tape. An attachment structure 90 may be provided as a means for attaching the end 9 of the tape 8 to an intermediate location on the tape where the tape length adjustment structure is positioned. The attachment structure may be mounted on the first portion 82 of the adjustment structure 80, and may comprise a hook 92 that is formed on the first portion for engaging the ledge or tab on the end 9 of the tape 8. The hook 92 may open toward the tape 8 extending through the adjustment structure, so that the extent of the tape adjacent to the end 9 of the tape may be folded over on itself and the ledge of the tape may be generally mounted on the hook 92 to form a loop.

In use, the tape measure 5 is mounted on the tape measure mounting assembly 40 by positioning the mounting ear 46 of the mounting assembly between the housing 6 and the clip 7 of the tape measure 5, which may require temporary removal of the clip from the housing by unscrewing a threaded fastener, and passing the fastener through the clip, the hole in the mounting ear, and into the housing 6 of the tape measure. The mounting plate 42 of the mounting assembly may then be positioned in the slot 32 with the grooves 48, 49 of the mounting plate receiving each of the tongues 36, 37 of the side edges defining the slot.

The position of the mounting plate 42 and measuring tape may then be adjusted in the slot 32 at a suitable distance from the work edge 16. A suitable distance may be determined by, for example, the degree to which the motor housing of a power saw to be used with the guide 10 overhangs the base 12 when the power saw is moved along the work edge 16 during cutting movement. Since the upward protrusion of the housing 6 of the tape measure may interfere with the movement of the motor housing while the saw is moved along the work edge, the mounting plate 42 and the tape measure may need to be moved further away from the work edge then might otherwise be necessary in order to provide sufficient clearance for the movement of the motor housing of the saw.

Once a suitable distance is determined, the securing fastener 54 of the position securing assembly may be tightened to secure the mounting plate 42 against movement in the slot 32 with respect to the base 12. The distance between the work edge and the indicator tab 56 on the mounting assembly is determined, and the tape adjustment structure 80 is positioned on the tape 8 at a similar if not identical distance from the end 9 of the tape, so that the auxiliary tape ledge 84 is located at that distance from the end of the tape. The effective length of the extended portion of the tape that is read at the indicator tab 56 is thus corrected for the distance between the indicator tab and the work edge.

The auxiliary tape ledge 56 may then be hooked or otherwise secured to an end of the work piece from which the operation, such as cutting, is to be performed. The guide 10 is moved down the length of the work piece until the portion of the tape 8 positioned adjacent to the indicator tab 56 aligns with the indicia on the tape at the desired measurement from the end of the work piece. The base edge 14 of the base 12 may then be aligned with a side edge of the work piece, such as by pressing the alignment shoulder 26 against the side edge. The work edge 16 is thus positioned at the desired distance from the end of the work piece and the work edge is also oriented perpendicular to the side edge of the work piece.

If the width of the work piece is relatively great, the extension arm 60 may be pivoted from the stored position to the use position so that the work extension edge 62 extends the work edge 16 for guidance over a greater distance. If the length of the work piece is relatively great, the tape support member 70 may be mounted on the slot 32 of the base 12 to support the portion of the tape located near the housing 6 of the tape measure.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable position tool guide for positioning at an adjustable distance from an end of a work piece, the tool guide comprising:
    a base for positioning on the work piece, the base having a base edge for aligning in a substantially parallel orientation with a longitudinal axis of the work piece and a work edge oriented perpendicular to the base edge for being oriented perpendicular to the longitudinal axis of the work piece when the base edge is aligned parallel with the longitudinal axis of the workpiece, the base having a slot formed therein;
    a tape measure mounting assembly mounted on the base for mounting a tape measure on the base, the tape measure mounting assembly being slidably moveable along the slot in the base to permit adjustment of a position of the tape measure along a line oriented substantially parallel to the base edge of the base when the tape measure is mounted on the tape measure mounting assembly; and
    a tool tape length adjustment means removably mountable on a tape of a tape measure for adjusting an effective measuring length of the tape from a housing of the tape measure, the tape length adjustment means being positionable at a selected distance from an end of the tape of the tape measure, wherein the tape length adjustment means includes attachment means for attaching the end of the tape to an intermediate location on the tape.

2. The adjustable position tool guide of claim 1 wherein the base has an alignment shoulder for resting against a longitudinal edge of the workpiece for aligning the base edge with the longitudinal axis of the work piece.

3. The adjustable position tool guide of claim 1 wherein the slot formed in the base has a longitudinal axis extending substantially parallel to the base edge.

4. The adjustable position tool guide of claim 3 wherein the tape measure mounting assembly extends into the slot of the base and is movable in the slot.

5. The adjustable position tool guide of claim 4 wherein the tape measure mounting assembly comprising:
    a mounting plate slidably mounted on the base; and
    a mounting ear extending from the mounting plate for removably securing the tape measure to the mounting plate, the mounting ear being positionable between a housing of the tape measure and a securing clip of the tape measure such that securing the securing clip to the housing of the tape measure mounts the tape measure to the mounting ear and the mounting plate.

6. The adjustable position tool guide of claim 1 wherein the tape measure mounting assembly includes at lest one indicator tab for positioning over an extended portion of a tape of a tape measure mounted on the tape measure mounting assembly.

7. The adjustable position tool guide of claim 1 additionally comprising an extension arm mounted on the base for selectively extending the work edge of the base, the extension arm being pivotally mounted on the base, the extension arm have a use position in which the work extension edge is oriented substantially linear with the work edge of the base and a stored position in which the extension arm is positioned adjacent to the base.

8. The adjustable position tool guide of claim 1 wherein the base has an outer perimeter edge, and the base edge and the work edge form a portion of the outer perimeter of the base.

9. The adjustable position tool guide of claim 1 wherein the tape measure mounting assembly is configured such that sliding movement of the tape measure mounting assembly causes movement of the tape measure relative to the base when the tape measure is mounted on the tape measure mounting assembly.

10. The adjustable position tool guide of claim 1 wherein the slot in the base is configured such that sliding movement of the tape measure mounting assembly adjusts a distance between the tape measure mounting assembly and the work edge of the base.

11. An adjustable position tool guide for positioning at an adjustable distance from an end of a work piece, the tool guide, comprising:
    a base for positioning on the work piece, the base having a base edge for aligning in a substantially parallel orientation with a longitudinal axis of the work piece and a work edge oriented perpendicular to the base edge for being oriented perpendicular to the longitudinal axis of the work piece when the base edge is aligned parallel with the longitudinal axis of the workpiece, the base having a slot formed therein; and
    a tape measure mounting assembly mounted on the base for mounting a tape measure on the base, the tape measure mounting assembly being slidably moveable along the slot in the base to permit adjustment of a position of the tape measure along a line oriented substantially parallel to the base edge of the base when the tape measure is mounted on the tape measure mounting assembly;
    an elongate tape support member for supporting an extended portion of a tape of the tape measure, the tape support member being removably mounted on the base.

12. The adjustable position tool guide of claim 11 wherein the base has a guide structure including the slot formed in the base, and the tape support member is removably insertable into the slot of the base for positioning adjacent to the tape measure mounting assembly.

13. An adjustable position tool guide for positioning at an adjustable distance from an end of a work piece, comprising:

a base for positioning on the work piece, the base having a base edge for aligning in a substantially parallel orientation with a longitudinal axis of the work piece, the base having a work edge oriented perpendicular to the base edge for being oriented perpendicular to the longitudinal axis of the work piece when the base edge is aligned parallel with the longitudinal axis of the work piece, the base having a top side and a bottom side, the base having an auxiliary edge located on the base opposite the base edge, wherein the base has an alignment shoulder for resting against a longitudinal edge of the work piece for aligning the base edge with the longitudinal axis of the work piece, the alignment shoulder extending from the bottom side of the base, the alignment shoulder extending from the top side of the base;

wherein the base has a guide structure formed therein, the guide structure comprising:

a slot formed in the base, the slot being elongate and having a longitudinal axis extending substantially parallel to the base edge, the slot being defined by a pair of opposite side edges along opposite sides of the slot; and a pair of tongues, each tongue being formed along one of the opposite side edges of the slot, each of the tongues opening into the slot;

a tape measure mounting assembly for mounting a tape measure on the base, the tape measure mounting assembly being slidably moveable on the base along a line oriented substantially parallel to the base edge of the base, the tape measure mounting assembly extending into the slot of the base and being moveable in the slot, the tape measure mounting assembly being mounted on the tongues of the side edges of the slot, the tape measure mounting assembly comprising:

a mounting plate slidably mounted on the base, the mounting plate having marginal side portions on opposite locations on the mounting plate, the marginal side portions of the mounting plate each having a groove formed therein for receiving the tongues of the opposite side edges of the slot of the base;

a mounting ear extending from the mounting plate for removably securing the tape measure to the mounting plate, the mounting ear being positionable between a housing of the tape measure and a securing clip of the tape measure such that securing the securing clip to the housing of the tape measure mounts the tape measure to the mounting ear and the mounting plate, securing means for securing the position of the mounting plate in the slot of the base, the securing means comprising a position securing assembly, the position securing assembly comprising:

a securing tab extending from the mounting plate over the base; and a securing fastener extending through the securing tab and extending into the base;

at least one indicator tab extending from the mounting plate for positioning over an extended portion of the tape of the tape measure;

an extension arm mounted on the base for selectively extending the work edge of the base, the extension arm being pivotally mounted on the base, the extension arm having a use position in which the work extension edge is oriented substantially linear with the work edge of the base and a stored position in which the extension arm is positioned adjacent the auxiliary edge of the base;

an elongate tape support member for supporting an extended portion of the tape of the tape measure, the tape support member being removably mounted on the base, the tape support member being removably insertable into the slot of the base for positioning adjacent to the tape measure mounting assembly, the tape support member comprising:

a bottom wall for resting a portion of the tape thereon, the bottom wall having opposite side edges for removably receiving the tongues of the opposite side edges of the slot; and a pair of side walls mounted on and extending upwardly from the bottom wall, the side walls extending substantially parallel to each other;

tape length adjustment means removably mountable on the tape of the tape measure for adjusting an effective extension length of the tape from the housing of the tape measure, the tape length adjustment means being positionable at a selected distance from an end of the tape of the tape measure, the selected distance corresponding to a distance between the work edge and the indicator tab of the tape measure mounting assembly, the tape length adjustment means comprising:

a first portion for cradling a portion of the tape of the tape measure, the first portion being positionable below the portion of the tape, the first portion having a concave upper surface, the first portion forming a substantially U-shaped channel, an auxiliary tape ledge for hooking on a ledge hook; and a second portion being removably mountable on the first portion, a portion of the second portion being removably nestable in the substantially U-shaped channel of the first portion, the second portion comprising a first section and a second section pivotally mounted together for pinching the portion of the tape of the tape measure therebetween, the first and second sections of the second portion being held together to pinch the tape when the portion of the second portion is nested in the U-shaped channel of the first portion;

wherein the tape length adjustment means includes attachment means for attaching the end of the tape to an intermediate location on the tape, the attachment means being mounted on the first portion, the attachment means comprising a hook formed on the first portion for engaging a tape hook mounted on the end of the tape of the tape portion, the hook opening toward the tape such that the tape may be folded over on itself and the tape hook mounted on the hook.

14. An adjustable position tool guide for positioning at an adjustable distance from an end of a work piece, the tool guide comprising:

a base for positioning on the work piece, the base having a base edge for aligning in a substantially parallel orientation with a longitudinal axis of the work piece and a work edge oriented perpendicular to the base edge for being oriented perpendicular to the longitudinal axis of the work piece when the base edge is aligned parallel with the longitudinal axis of the work piece; and a tape measure mounting assembly mounted on the base for mounting a tape measure on the base, the tape measure mounting assembly being slidably movable on the base along a line oriented substantially parallel to the base edge of the base;

wherein the base has a guide structure formed therein, the guide structure including a slot formed in the base with a longitudinal axis extending substantially parallel to the base edge;

wherein the tape measure mount assembly comprises:
a mounting plate slidably mounted on the base; and
a mounting ear extending from the mounting plate for removably securing the tape measure to the mounting plate for, the mounting ear being positionable between a housing of the tape measure and a securing clip of the tape measure such that securing the securing clip to the housing of the tape measure mounts the tape measure to the mounting ear and the mounting plate.

15. The adjustable position tool guide of claim 14 wherein the tape measure mounting assembly extends into the slot of the base and is movable in the slot.

16. An adjustable position tool guide for positioning at an adjustable distance from an end of a work piece, the tool guide comprising:

a base for positioning on the work piece, the base having a base edge for aligning in a substantially parallel orientation with a longitudinal axis of the work piece and a work edge oriented perpendicular to the base edge for being oriented perpendicular to the longitudinal axis of the work piece when the base edge is aligned parallel with the longitudinal axis of the work piece; and a tape measure mounting assembly mounted on the base for mounting a tape measure on the base, the tape measure mounting assembly being slidably moveable on the base along a line oriented substantially parallel to the base edge of the base; and attachment means adapted for attaching an end of the tape to an intermediate location on the tape;

wherein the attachment means is capable of sliding along at least a portion of a length of the tape to permit adjustment of the position of the attachment means on the tape.

17. The adjustable position tool guide of claim 16 wherein the attachment means is capable of being positioned in any one of an infinite number of positions along the at least a portion of the length of the tape.

* * * * *